(12) United States Patent
Zhan et al.

(10) Patent No.: US 10,274,798 B2
(45) Date of Patent: Apr. 30, 2019

(54) BLACK MATRIX STRUCTURE AND MANUFACTURING METHOD THEREOF, ARRAY SUBSTRATE, COLOR FILTER SUBSTRATE AND DISPLAY APPARATUS

(71) Applicants: BOE TECHNOLOGY GROUP CO., LTD., Beijing (CN); BEIJING BOE DISPLAY TECHNOLOGY CO., LTD., Beijing (CN)

(72) Inventors: Hongming Zhan, Beijing (CN); Lifeng Lin, Beijing (CN); Xibin Shao, Beijing (CN); Ming Chen, Beijing (CN); Woong Kim, Beijing (CN); Zhanchang Bu, Beijing (CN); Yu Ma, Beijing (CN); Tonghua Yang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 143 days.

(21) Appl. No.: 14/891,979

(22) PCT Filed: Jun. 16, 2015

(86) PCT No.: PCT/CN2015/081529
§ 371 (c)(1),
(2) Date: Nov. 18, 2015

(87) PCT Pub. No.: WO2016/086642
PCT Pub. Date: Jun. 9, 2016

(65) Prior Publication Data
US 2016/0342049 A1    Nov. 24, 2016

(30) Foreign Application Priority Data

Dec. 1, 2014   (CN) .......................... 2014 1 0720401

(51) Int. Cl.
*G02F 1/1335* (2006.01)
*G02F 1/1362* (2006.01)
*G02F 1/1368* (2006.01)

(52) U.S. Cl.
CPC ...... *G02F 1/136209* (2013.01); *G02F 1/1368* (2013.01); *G02F 1/133512* (2013.01);
(Continued)

(58) Field of Classification Search
CPC ............. G02F 1/136209; G02F 1/1335; G02F 1/133514; G02F 1/1362; G02F 1/136286;
(Continued)

(56) References Cited

U.S. PATENT DOCUMENTS 6,348,758 B1 * 2/2002 Kim ................. H01J 29/07
313/402
2002/0041354 A1   4/2002 Noh et al.
(Continued)

FOREIGN PATENT DOCUMENTS

CN    1696797 A    11/2005
CN    1834753 A    9/2006
(Continued)

OTHER PUBLICATIONS

Office Action dated Oct. 8, 2016 issued in corresponding Chinese Application No. 201410720401.4.
(Continued)

*Primary Examiner* — Collin X Beatty
(74) *Attorney, Agent, or Firm* — Nath, Goldberg & Meyer; Joshua B. Goldberg

(57) ABSTRACT

A black matrix structure and manufacturing method thereof, an array substrate, a color filter substrate and a display apparatus are provided. The black matrix structure comprises a first black matrix and a plurality of predefined opening regions arranged in an array and surrounded by
(Continued)

lines of the first black matrix, wherein, each of the predefined opening regions is provided with an opening therein, and at least one of the predefined opening regions is provided with a second black matrix therein, edges of shading pattern of the second black matrix are adjacent to the opening or in contact with at least one line edge of the first black matrix, and length of a part of each line edge of the first black matrix being in contact with the edge of shading pattern of the second black matrix is less than length of this line edge of the first black matrix.

20 Claims, 5 Drawing Sheets

(52) U.S. Cl.
CPC .. *G02F 1/136286* (2013.01); *G02F 1/133514* (2013.01); *G02F 2203/04* (2013.01)

(58) Field of Classification Search
CPC .............. G02F 1/1368; G02F 1/133707; G02F 1/134336
USPC ........................................... 359/891; 349/106
See application file for complete search history.

(56) References Cited

U.S. PATENT DOCUMENTS

| | | | |
|---|---|---|---|
| 2007/0291216 A1* | 12/2007 | Chan | G02F 1/1339 349/153 |
| 2012/0008073 A1 | 1/2012 | Ota | |
| 2016/0085264 A1* | 3/2016 | Choi | G02F 1/133 216/41 |

FOREIGN PATENT DOCUMENTS

| | | |
|---|---|---|
| CN | 1892369 A | 1/2007 |
| CN | 102681247 A | 9/2012 |
| CN | 104375319 A | 2/2015 |
| CN | 204203586 U | 3/2015 |

OTHER PUBLICATIONS

Form PCT/ISA/237 for international application No. PCT/CN2015/081529 dated Sep. 11, 2015.

* cited by examiner

BLACK MATRIX STRUCTURE AND MANUFACTURING METHOD THEREOF, ARRAY SUBSTRATE, COLOR FILTER SUBSTRATE AND DISPLAY APPARATUS

This is a National Phase Application filed under 35 U.S.C. 371 as a national stage of PCT/CN2015/081529, filed Jun. 16, 2015, an application claiming the benefit of Chinese Application No. 201410720401.4, filed Dec. 1, 2014, the content of each of which is hereby incorporated by reference in its entirety.

FIELD OF THE INVENTION

The present invention relates to the field of liquid crystal display technology, and particularly relates to a black matrix structure and manufacturing method thereof, an array substrate, a color filter substrate and a display apparatus.

BACKGROUND OF THE INVENTION

A pixel is a minimal display unit in a display apparatus. Each pixel includes a plurality of subpixels, and color filters with different colors are provided within the subpixels respectively so that the subpixels respectively display corresponding colors. During display, by adjusting light transmittance in each subpixel (i.e., brightness of the subpixels), the pixel can display with corresponding brightness and color.

The maximal brightness displayed by a pixel is relevant to the light transmittances of the color filters (which are determined by factors such as type, thickness, etc of the color filters.) and opening areas of the subpixels. Generally, the light transmittances of the color filters in the subpixels and the opening areas of the subpixels are respectively the same as each other so that the subpixels in each pixel have the same maximal brightness during display, which can avoid occurrence of color cast. When the light transmittances of the color filters in the subpixels are different from each other, they are compensated usually by adjusting the opening areas of the subpixels so that the subpixels have the same maximal brightness during display.

Taking each pixel including a subpixel R, a subpixel G and a subpixel B as an example, in order to achieve some particular high color gamut display, the subpixel G may need a color filter with large color saturation (small light transmittance). In this case, as shown in FIG. 1, areas of openings 12 in the subpixels R and B are reduced usually by increasing line width of black matrix 15 surrounding around the openings 12 in the subpixels R and B, so that the maximal brightness that the subpixels R and B can achieve is reduced, thus the respective subpixels display the same maximal brightness.

However, in actual, in case of increasing the line width of the black matrix 15, the line width of the black matrix 15 may become too large so that viewers may see "black lines". Particularly, in case of the number of pixels per unit area being small (PPI being low), the phenomenon of "black lines" is even more serious.

SUMMARY OF THE INVENTION

In order to solve at least one of the problems existing in the prior art, the present invention provides a black matrix structure and a manufacturing method thereof, an array substrate, a color filter substrate and a display apparatus. The black matrix structure can reduce the probability that the viewers see the pattern of black matrix, thus the phenomenon of "black lines" is eliminated.

In order to achieve the objective of the present invention, provided is a black matrix structure, comprising a first black matrix and a plurality of predefined opening regions arranged in an array and surrounded by lines of the first black matrix, wherein, each of the predefined opening regions is provided with an opening therein, and at least one of the predefined opening regions is provided with a second black matrix therein, wherein, edges of shading pattern of the second black matrix are adjacent to the opening in every place of the edges; or, edges of shading pattern of the second black matrix are in contact with at least one line edge of the first black matrix, and length of a part of each line edge of the first black matrix being in contact with the edge of shading pattern of the second black matrix is less than length of this line edge of the first black matrix.

The second black matrix may include a plurality of shading patterns, and the plurality of shading patterns may be arranged uniformly in the predefined opening regions.

The first black matrix and the second black matrix may be formed in a single patterning process.

The predefined opening region of the subpixel provided with the second black matrix may further include a third black matrix therein, edges of shading pattern of the third black matrix are in contact with one or more line edges of the first black matrix, and length of a part of at least one line edge of the first black matrix being in contact with the edge of shading pattern of the third black matrix is equal to length of the at least one line edge of the first black matrix.

The first black matrix, the second black matrix and the third black matrix may be formed in a single patterning process.

The shading pattern of the second black matrix may be polygonal, circular, or elliptical.

The shading pattern of the second black matrix may have a dimension in at least one direction less than the minimal length that human eyes can see.

As another technical solution, the present invention also provides a manufacturing method of the above black matrix structure, comprising steps of: forming the first black matrix; and forming the second black matrix in at least one of the predefined opening regions.

Patterns of the first black matrix and the second black matrix may be formed in a single patterning process.

The manufacturing method may further comprise a step of forming the third black matrix in the predefined opening region provided with the second black matrix.

Patterns of the first black matrix, the second black matrix and the third black matrix may be formed in a single patterning process.

As still another technical solution, the present invention also provides an array substrate, comprising the black matrix structure of the present invention.

The array substrate comprises a plurality of pixels, each of which may for example include a red subpixel, a green subpixel and a blue subpixel, each subpixel includes a predefined opening region, the opening of the green subpixel may be identical to the predefined opening region, the predefined opening regions of the red subpixel and the blue subpixel may be provided with a second black matrix therein.

As further another technical solution, the present invention also provides a color filter substrate, comprising the black matrix structure of the present invention.

The color filter substrate comprises a plurality of pixels, each of which may for example include a red subpixel, a green subpixel and a blue subpixel, each subpixel includes a predefined opening region, the opening of the green subpixel may be identical to the predefined opening region, the predefined opening regions of the red subpixel and the blue subpixel may be provided with a second black matrix therein.

As further another technical solution, the present invention also provides a display apparatus, comprising the array substrate of the present invention or the color filter substrate of the present invention.

In the black matrix structure of the present invention, edges of shading pattern of the second black matrix are adjacent to the opening in every place of the edges, or edges of shading pattern of the second black matrix are in contact with at least one line edge of the first black matrix, and the length of a part of each line edge of the first black matrix being in contact with the edge of shading pattern of the second black matrix is less than the length of this line edge of the first black matrix, thus the first black matrix and the second black matrix are prevented from being united to form a black matrix with a shading pattern having a greater width and a greater area, or the width and the area of the shading pattern of the black matrix formed by uniting the first black matrix and the second black matrix are reduced. Compared to the prior art, the black matrix structure of the present invention can reduce the opening area of the pixel, while reducing the probability that the viewers see the pattern of black matrix, and reducing "black lines" seen by the viewers, thereby the defect of occurrence of "black lines" is eliminated.

The black matrix structure manufactured by the manufacturing method of the present invention also can reduce the opening area of the pixel, while reducing the probability that the viewers see the pattern of black matrix, and reducing "black lines" seen by the viewers, thereby the defect of occurrence of "black lines" is eliminated.

The array substrate of the present invention employs the black matrix structure of the present invention, thus it also can reduce the opening area of the pixel, while reducing the probability that the viewers see the pattern of black matrix, and reducing "black lines" seen by the viewers, thereby the defect of occurrence of "black lines" is eliminated.

The color filter substrate of the present invention employs the black matrix structure of the present invention, thus it also can reduce the opening area of the pixel, while reducing the probability that the viewers see the pattern of black matrix, and reducing "black lines" seen by the viewers, thereby the defect of occurrence of "black lines" is eliminated.

The display apparatus of the present invention employs the array substrate of the present invention or the color filter substrate of the present invention, thus it also can reduce the opening area of the pixel, while reducing the probability that the viewers see the pattern of black matrix, and reducing "black lines" seen by the viewers, thereby the defect of occurrence of "black lines" is eliminated.

BRIEF DESCRIPTION OF THE DRAWINGS

Drawings are used for providing further comprehension of the present invention, constitute a part of specification, and are used for illustrating the present invention together with the following specific implementations, but the present invention is not limited thereto. In the drawings.

Figure 1:
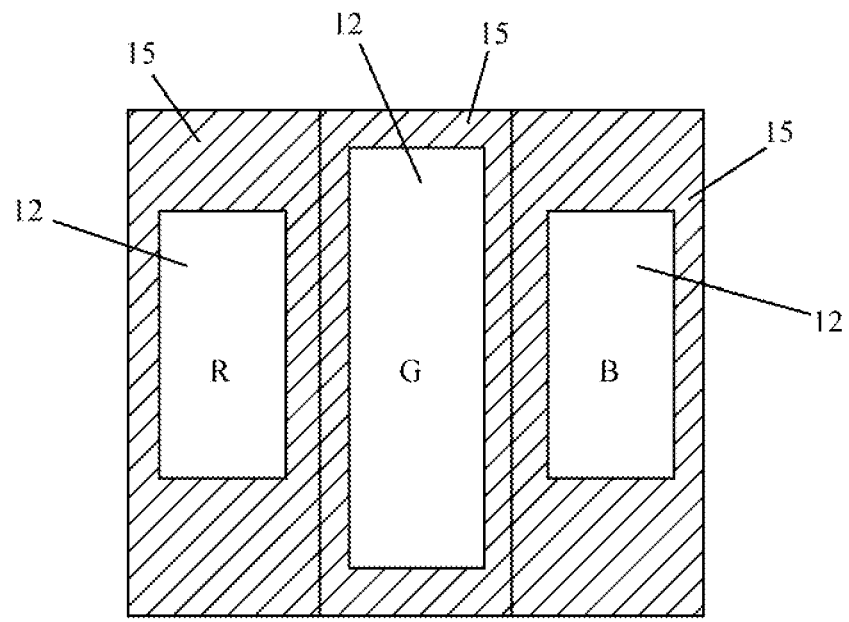
FIG. 1 is a diagram of a black matrix structure in the prior art.

REFERENCE NUMERALS 1, subpixel; 10, predefined opening region; 11, first black matrix; 12, opening; 13, second black matrix; 14, third black matrix; 15, black matrix.

DETAILED DESCRIPTION OF THE EMBODIMENTS

Detailed descriptions of specific implementations in the present invention will be given below in conjunction with the accompanying drawings. It should be understood that, the specific implementations are described in detail here for explaining and illustrating the present invention, but the present invention is not limited thereto.

Figure 2:
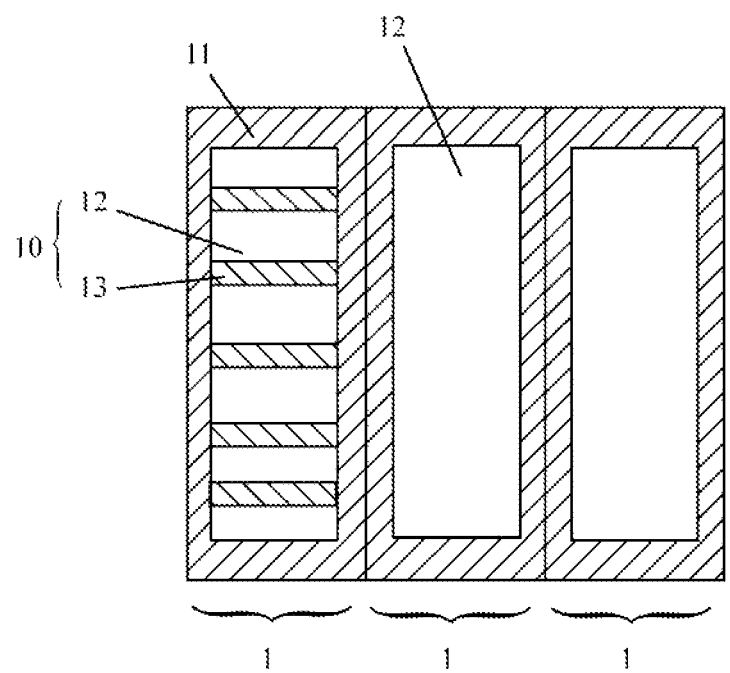
FIG. 2 is a diagram of a black matrix structure in an embodiment of the present invention.

Referring to FIG. 2, FIG. 2 is a diagram of a black matrix structure in an embodiment of the present invention. In this embodiment, the black matrix structure includes a first black matrix 11 and a plurality of predefined opening regions 10 arranged in an array and surround by lines of the first black matrix 11. Each predefined opening region 10 is provided with an opening 12 therein, and at least one predefined opening region 10 is provided with a second black matrix 13 therein. Edges of shading pattern of the second black matrix 13 are adjacent to the opening 12 in every place of the edges, that is, the shading pattern of the second black matrix 13 is not in contact with the first black matrix 11; or, edges of shading pattern of the second black matrix 13 are in contact with at least one line edge of the first black matrix 11, and the length of a part of the at least one line edge of the first black matrix 11 being in contact with the edge of shading pattern of the second black matrix 13 is less than the length of the at least one line edge of the first black matrix 11.

Generally, each pixel includes a plurality of subpixels 1, and each predefined opening region 10 corresponds to one subpixel 1. Specifically, each pixel may include a red subpixel, a green subpixel and a blue subpixel. In the present embodiment, according to the need, the opening of the green subpixel may be set to be identical to the predefined opening region, while the predefined opening regions of the red subpixel and the blue subpixel are provided with a second black matrix 13 therein.

Generally, an array substrate comprises gate lines, data lines, other signal lines, pixel electrodes and thin film transistors. There is an uncontrolled electrical filed in the region where the gate lines, the data lines, other signal lines and the thin film transistors are located. In the present embodiment, the first black matrix 11 is used for covering the region where the gate lines, the data lines, other signal lines and the thin film transistors are located, to prevent the display effect from being affected by the uncontrolled electrical field. In the present embodiment, the term of "predefined opening region 10" refers to a region in each pixel except for the first black matrix 11.

Specifically, in the black matrix structure, in accordance with the opening ratio required by each subpixel 1 and the area of the opening 12, the second black matrix 13 is provided in the predefined opening region 10 of one or more subpixels, and the area of shading pattern of the second black matrix 13 in the predefined opening region 10 is determined according to the need, for example, as for RGB pixel structure, in order to achieve some particular high color gamut display, the subpixel G may need a color filter with large color saturation (small light transmittance), the transmittance of the subpixel R needs to be higher, and the transmittance of the subpixel B needs to be highest, thus the relationship between the areas of the openings to be formed is as follows: the opening area of the subpixel G>the opening area of the subpixel R>the opening area of the subpixel B. Specifically, the ratio of the opening areas may be calculated and set in accordance with the type of material of the black matrix and the display objective.

Figure 3:
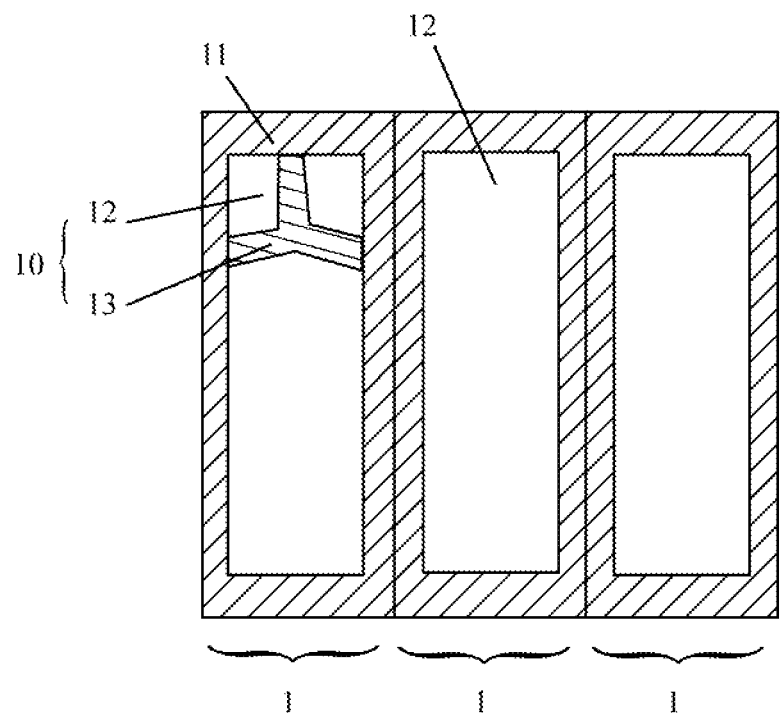
FIG. 3 is a diagram showing that a shading pattern of a second black matrix is in contact with three line edges of a first black matrix.
Figure 4:
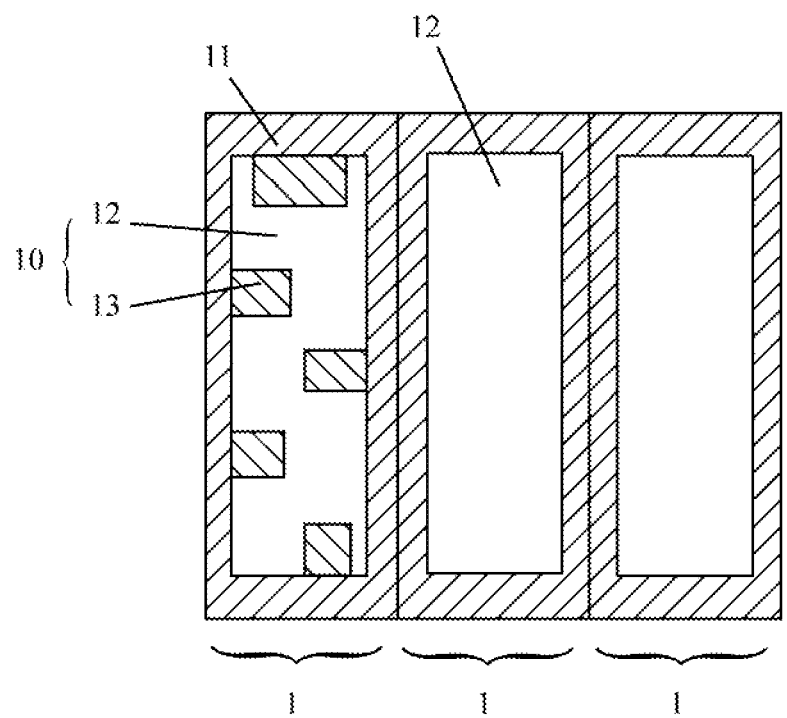
FIG. 4 is a diagram showing that the shading pattern of the second black matrix is in contact with one line edge of the first black matrix.
Figure 5:
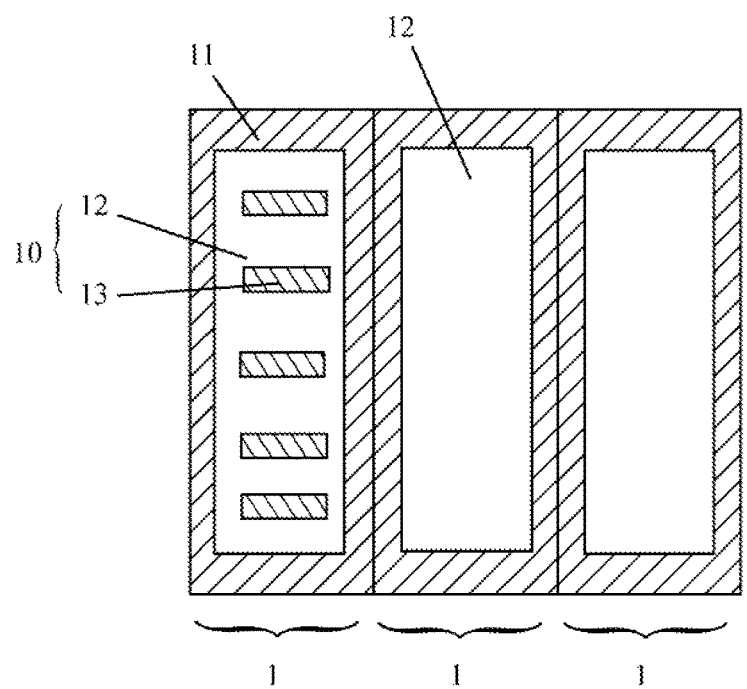
FIG. 5 is a diagram showing that the second black matrix is not in contact with the first black matrix.

In the present embodiment, edges of shading pattern of the second black matrix 13 are adjacent to the opening 12 in every place of the edges; or the second black matrix 13 is in contact with at least one line edge of the first black matrix 11, and the length of a part of each line edge of the first black matrix 11 being in contact with the edge of shading pattern of the second black matrix 13 is less than the length of this line edge of the first black matrix 11. That is, in the present embodiment, there are following three cases: (1) the second black matrix 13 is in contact with two or more line edges of the first black matrix 11, as shown in FIGS. 2-3; (2) at least a part of shading pattern of the second black matrix 13 is in contact with one line edge of the first black matrix 11, as shown in FIG. 4; (3) the second black matrix 13 is not in contact with any line edge of the first black matrix 11, as shown in FIG. 5.

First, referring to FIG. 2, the second black matrix 13 includes a plurality of shading patterns provided with intervals therebetween, two sides of each shading pattern are in contact with two line edges of the first black matrix 11 respectively, and the length of each contact part of the first black matrix 11 is less than that of the line edge of the first black matrix 11 that the contact part belongs to. Seen from the figure, there is a region (i.e., the opening 12) between the first black matrix 11 and the second black matrix 13, which is not covered by the shading patterns of the black matrixes. In this case, although the first black matrix 11 is in contact with the second black matrix 13, they are not united to form a black matrix with shading pattern having a larger width and a larger area. Compared to the prior art, the probability that the viewers see the pattern of black matrix is reduced, and "black lines" seen by the viewers are reduced, thereby the defect of occurrence of "black lines" is eliminated.

Referring to FIG. 3, the second black matrix 13 includes a shading pattern with three branches, the three branches are in contact with three line edges of the first black matrix 11 respectively, and the length of each contact part is less than that of the line edge of the first black matrix 11 that the contact part belongs to. Seen from the figure, similar to that in FIG. 2, there is also the opening 12 between the first black matrix 11 and the second black matrix 13, thus the probability that the viewers see the pattern of black matrix is reduced, and "black lines" seen by the viewers are reduced, thereby the defect of occurrence of "black lines" is eliminated.

Referring to FIG. 4, the second black matrix 13 includes a plurality of shading patterns, and the plurality of shading patterns are provided with intervals therebetween. Each shading pattern is in contact with one line edge of the first black matrix 11, and the length of contact part of the first black matrix 11 is less than that of the line edge of the first black matrix 11 that the contact part belongs to. Seen from the figure, the first black matrix 11 is only in contact with the second black matrix 13, and the line width of other parts of the first black matrix 11 is not widened. Compared to the prior art, the width and the area of shading pattern of the black matrix formed by uniting the first black matrix 11 and the second black matrix 13 are reduced, "black lines" seen by the viewers are reduced or the probability that the viewers see the pattern of black matrix is reduced, thereby the defect of occurrence of "black lines" is eliminated.

Referring to FIG. 5, the second black matrix 13 includes a plurality of shading patterns, and the plurality of shading patterns are provided with intervals therebetween. Edges of each shading pattern are adjacent to the opening 12 in every place of the edges, that is, the second black matrix 13 is not in contact with the first black matrix 11. Thus, it can be determined and also seen from FIG. 5 that, the first black matrix 11 and the second black matrix 13 will not be united to form a black matrix with shading pattern having a larger width and a larger area, thus, compared to the prior art, the probability that the viewers see the pattern of black matrix is reduced, thereby the defect of occurrence of "black lines" is eliminated.

As above, in the present embodiment, edges of shading pattern of the second black matrix 13 are adjacent to the opening 12 in every place of the edges, or the shading pattern of the second black matrix 13 are in contact with at least one line edge of the first black matrix 11, and the length of a part, being in contact with the shading pattern of the second black matrix 13, of each line edge of the first black matrix 11, is less than the length of this line edge of the first black matrix 11, thus compared to the prior art, the first black matrix 11 and the second black matrix 13 are prevented from being united to form a black matrix with a shading pattern having a greater width and a greater area, or the width and the area of the shading pattern of the black matrix formed by uniting the first black matrix 11 and the second black matrix 13 are reduced. Thus, the probability that the viewers see the pattern of black matrix is reduced, and "black lines" seen by the viewers are reduced, thereby the defect of occurrence of "black lines" is eliminated.

In the present embodiment, preferably, the second black matrix 13 in the predefined opening region 10 provided with the second black matrix 13 therein includes a plurality of shading patterns, compared to the embodiment in which the second black matrix 13 only includes one shading pattern, the width and the area of each shading pattern of the second black matrix 13 is reduced without changing the area of the opening 12 (that is, the area of shading pattern of the second black matrix 13 in the predefined opening region 10 is not increased), thus the second black matrix 13 is not easy to be seen by viewers. Further preferably, the shading patterns of the second black matrix 13 are arranged uniformly in the predefined opening area 10, thus avoiding that the shading patterns of the second black matrix 13 aggregate in a certain region to cause "black lines" to be seen by viewers.

Specifically, the first black matrix 11 and the second black matrix 13 may be formed in a single patterning process, which will not result in increasing of process steps for manufacturing the black matrix structure, thus the production efficiency and production cost remain substantially unchanged.

Figure 6:
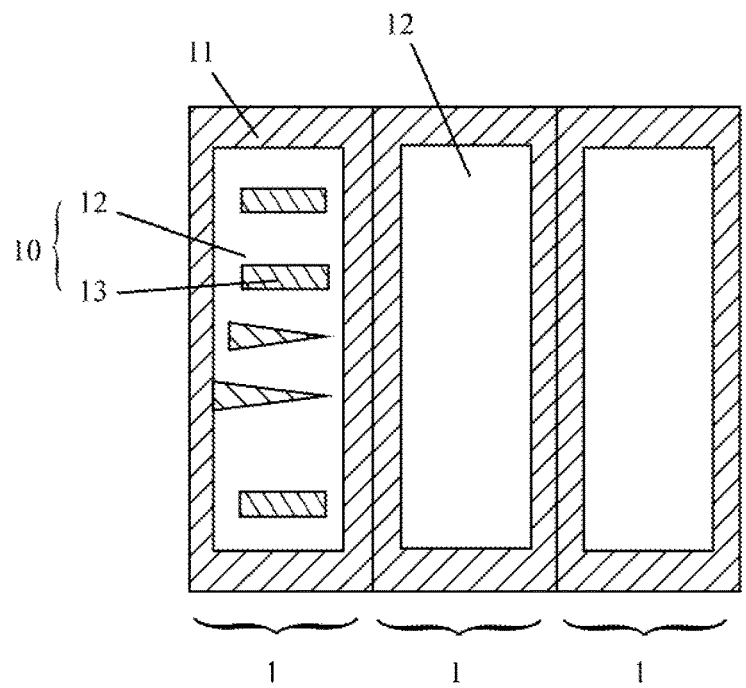
FIG. 6 is a diagram showing that the shape of the shading pattern of the second black matrix is a rectangle or a triangle.
Figure 7:
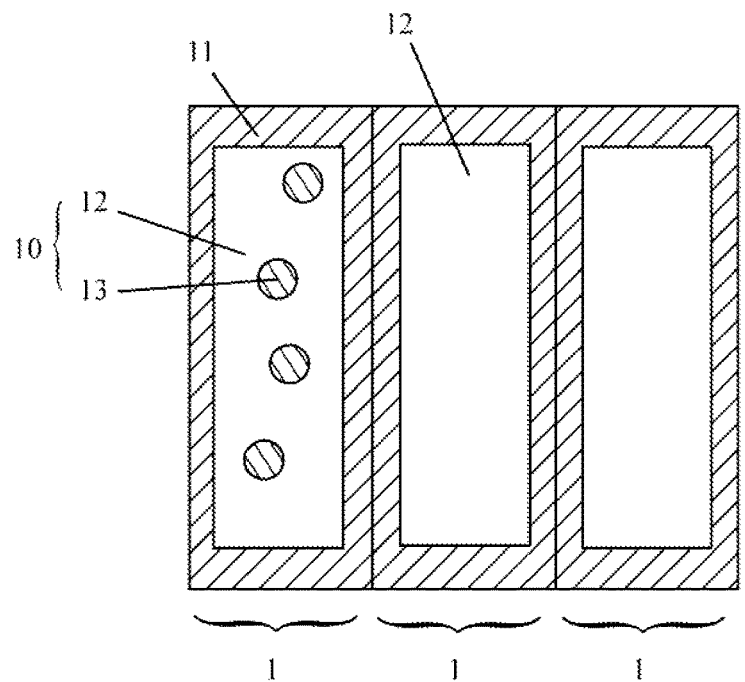
FIG. 7 is a diagram showing that the shape of the shading pattern of the second black matrix is a circle.
Figure 8:
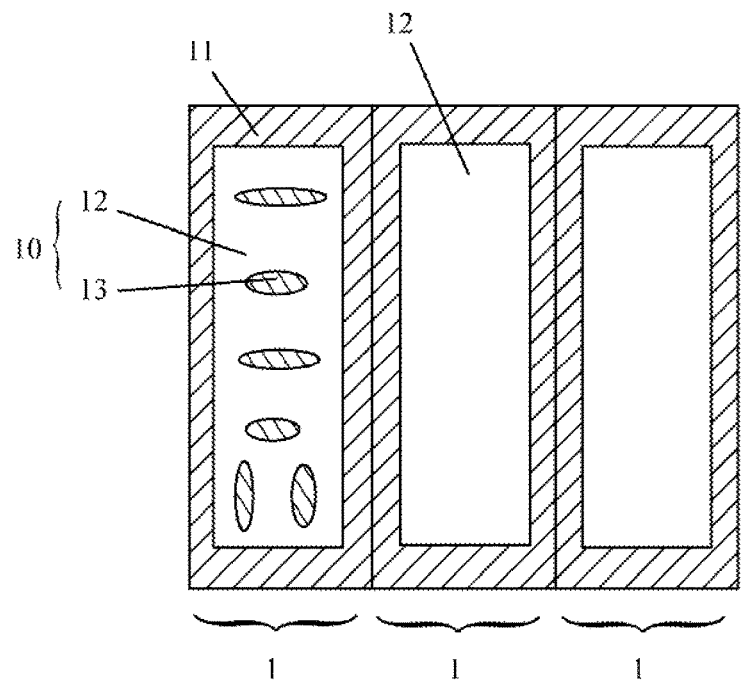
FIG. 8 is a diagram showing that the shape of the shading pattern of the second black matrix is an ellipse.

In the present embodiment, the shading pattern of the second black matrix 13 may be in a shape of rectangle. As shown in FIGS. 2, 4, and 5, the shading pattern of the second black matrix 13 may also be in a shape of other polygons such as triangle. In addition, the shading pattern of the second black matrix 13 may also be in a shape of circle, ellipse or others. Specifically, parameters such as shape, area of the shading pattern of the second black matrix 13 are determined in accordance with the distance between human eyes and the display apparatus during the usage of the display apparatus, so that, when there is a normal using distance between the human eyes and the display apparatus, the second black matrix 13 will not be seen. Preferably, in at least one direction, the shading pattern of the second black matrix 13 has a dimension less than the minimal length that the human eyes can see, so that viewers cannot see the second black matrix 13 no matter how far viewers distances from the display apparatus, thus the defect of occurrence of "black lines" is avoided completely. Generally, the minimal length that human eyes can see is 0.2 mm. For example, when the shading pattern of the second black matrix 13 has a shape of rectangle or triangle, as shown in FIG. 6, the length of the shortest side of the shading pattern of the second black matrix 13 is less than the minimal length that human eyes can see; when the shading pattern of the second black matrix 13 has a shape of circle, as shown in FIG. 7, the diameter length of the circular shading pattern is less than the minimal length that human eyes can see; when the shading pattern of the second black matrix 13 has a shape of ellipse, as shown in FIG. 8, the length of short axis of the elliptical shading pattern is less than the minimal length that human eyes can see.

Figure 9:
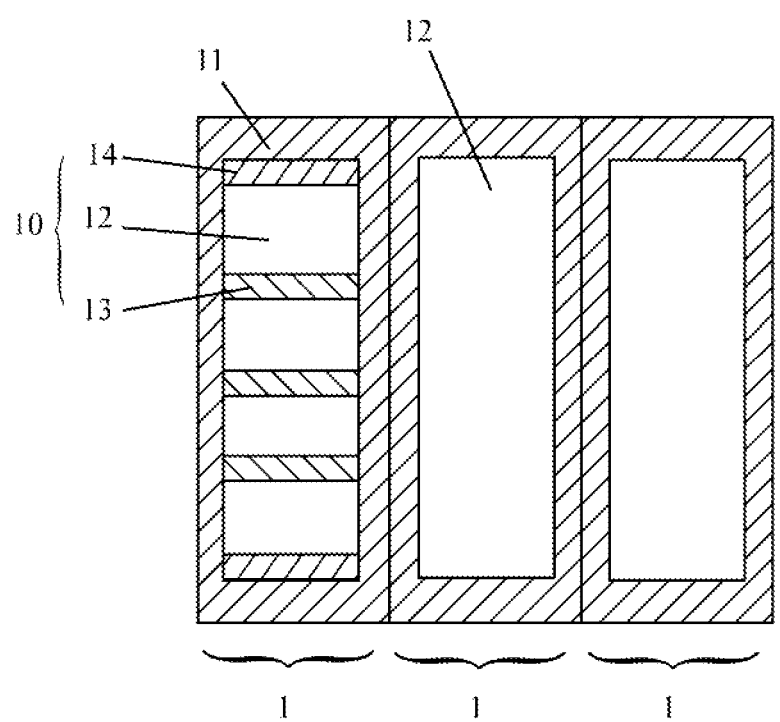
FIG. 9 is a diagram of a third black matrix.

In addition to the implementations as shown in FIGS. 2-5, in the present embodiment, as shown in FIG. 9, a third black matrix 14 may be provided in the predefined opening region 10 of the subpixel having the second black matrix 13. The shading pattern of the third black matrix 14 is in contact with one or more line edges of the first black matrix 11, and the length of a part, being in contact with the shading pattern of the third black matrix 14, of at least one line edge of the first black matrix 11, is equal to the length of the at least one line edge of the first black matrix 11. Seen from the figure, the first black matrix 11 and the third black matrix 14 are united into a black matrix with a shading pattern having a larger width and a larger area, but since the second black matrix 13 is also provided in the predefined opening area 10, compared to the prior art, in case that the area of the opening 12 is unchanged (that is, the total area of the shading patterns of the black matrix in the predefined opening region 10 is unchanged), the shading pattern of the black matrix formed by uniting the first black matrix 11 and the third black matrix 14 in the present embodiment has a width and an area smaller than those of the shading pattern of the black matrix in the prior art, thus, compared to the prior art, the probability that the viewers see the pattern of black matrix may be reduced to some extent, and "black lines" seen by the viewers are reduced, thereby the defect of occurrence of "black lines" is eliminated. Preferably, the first black matrix 11, the second black matrix 13 and the third black matrix 14 are formed in a single patterning process, which will not result in increasing of process steps for manufacturing the black matrix structure, thus the production efficiency and the production cost remain substantially unchanged.

In the black matrix structure of the present embodiment, edges of shading pattern of the second black matrix 13 are adjacent to the opening 12 in every place of the edges; or edges of shading pattern of the second black matrix 13 are in contact with at least one line edge of the first black matrix 11, and the length of a part of each line edge of the first black matrix 11 being in contact with the edge of shading pattern of the second black matrix 13 is less than the length of this line edge of the first black matrix 11. Compared to the prior art, the black matrix structure of the present embodiment can avoid that the first black matrix 11 and the second black matrix 13 are united to form a black matrix with a shading pattern having a greater width and a greater area, or the width and the area of the shading pattern of the black matrix formed by uniting the first black matrix 11 and the second black matrix 13 are reduced, thus, the area of the opening 12 is reduced, while the probability that the viewers see the pattern of black matrix is reduced, and "black lines" seen by the viewers are reduced, thereby the defect of occurrence of "black lines" is eliminated.

As another technical solution, the present invention also provides an embodiment of a manufacturing method of the above black matrix structure. In the present embodiment, the manufacturing method is used for manufacturing the black matrix structure provided by above embodiments of the present invention, specifically, it comprising steps of: forming the first black matrix; and forming the second black matrix in at least one of the predefined opening regions, wherein the formed first and second black matrixes are as those described in above embodiments and shown in the corresponding figures.

Specifically, patterns of the first black matrix and the second black matrix may be formed in a single patterning process, which will not result in increasing of process steps for manufacturing the black matrix structure, thus the production efficiency and the production cost remain substantially unchanged.

The manufacturing method may further comprise a step of forming the third black matrix in the predefined opening region provided with the second black matrix, wherein the formed third matrix is as that described in above embodiments and shown in the corresponding figures. Specifically, patterns of the first black matrix, the second black matrix and the third black matrix may be formed in a single patterning process, which will not result in increasing of process steps for manufacturing the black matrix structure, thus the production efficiency and the production cost remain substantially unchanged.

With the manufacturing method of black matrix structure provided by the present embodiment, the manufactured black matrix structure can reduce the probability that the viewers see the pattern of black matrix and "black lines" seen by the viewers while reducing the opening area of the pixel, thereby the defect of occurrence of "black lines" is eliminated.

As still another technical solution, the present invention also provides an embodiment of an array substrate. In the present embodiment, the array substrate comprises the black matrix structure provided in above embodiments of the present invention.

Preferably, the array substrate comprises a plurality of pixels, each of which includes a red subpixel, a green subpixel and a blue subpixel, each subpixel includes a predefined opening region, the opening of the green subpixel is identical to the predefined opening region, the predefined opening regions of the red subpixel and the blue subpixel are provided with a second black matrix therein.

The array substrate of the present embodiment employs the black matrix structure provided by above embodiments of the present invention, thus also can reduce the probability that the viewers see the pattern of black matrix and "black lines" seen by the viewers while reducing the opening area of the pixel, thereby the defect of occurrence of "black lines" is eliminated.

As further another technical solution, the present invention also provides an embodiment of a color filter substrate. In the present embodiment, the color filter substrate comprises the black matrix structure provided by above embodiments of the present invention.

Preferably, the color filter substrate comprises a plurality of pixels, each of which includes a red subpixel, a green subpixel and a blue subpixel, each subpixel includes a predefined opening region, the opening of the green subpixel is identical to the predefined opening region, the predefined opening regions of the red subpixel and the blue subpixel are provided with a second black matrix therein.

The color filter substrate of the present embodiment employs the black matrix structure provided by above embodiments of the present invention, thus also can reduce the probability that the viewers see the pattern of black matrix and "black lines" seen by the viewers while reducing the opening area of the pixel, thereby the defect of occurrence of "black lines" is eliminated.

As further another technical solution, the present invention also provides an embodiment of a display apparatus. In the present embodiment, the display apparatus comprises the array substrate or the color filter substrate provided by above embodiments of the present invention.

The display apparatus of the present embodiment employs the array substrate of the color filter substrate provided by above embodiments of the present invention, thus also can reduce the probability that the viewers see the pattern of black matrix and "black lines" seen by the viewers while reducing the opening area of the pixel, thereby the defect of occurrence of "black lines" is eliminated.

It should be understood that, the foregoing implementations are merely exemplary implementations used for explaining the principle of the present invention, but the present invention is not limited thereto. Those of ordinary skill in the art may make various variations and improvements without departing from the spirit and essence of the present invention, and these variations and improvements also fall within the protection scope of the present invention.

The invention claimed is:

1. A black matrix structure, comprising a first black matrix and a plurality of predefined opening regions arranged in an array, wherein, each of the plurality of the predefined opening regions is surrounded by lines of the first black matrix and corresponds to one subpixel, and each of the predefined opening regions is provided with an opening therein, and a second black matrix comprising a shading pattern is provided in at least one of the predefined opening regions, wherein,
    edges of the shading pattern of the second black matrix are adjacent to the opening in every place of the edges; or
    edges of the shading pattern of the second black matrix are in contact with at least one line edge of the first black matrix, and length of a part of each line edge of the first black matrix being in contact with the edge of the shading pattern of the second black matrix is less than length of this line edge of the first black matrix;
    wherein a length of an edge of the second black matrix being in contact with the first black matrix is less than half of the total length of the edges of the shading pattern of the second black matrix.

2. The black matrix structure of claim 1, wherein, the second black matrix comprises a plurality of shading patterns, and the plurality of shading patterns of the second black matrix are arranged uniformly in the predefined opening regions.

3. The black matrix structure of claim 1, wherein, the first black matrix and the second black matrix are formed in a single patterning process.

4. A black matrix structure, comprising a first black matrix and a plurality of predefined opening regions arranged in an array, wherein, each of the plurality of the predefined opening regions is surrounded by lines of the first black matrix and corresponds to one subpixel, and each of the predefined opening regions is provided with an opening therein, and a second black matrix comprising a shading pattern is provided in at least one of the predefined opening regions, wherein,
    edges of the shading pattern of the second black matrix are adjacent to the opening in every place of the edges: or
    edges of the shading pattern of the second black matrix are in contact with at least one line edge of the first black matrix, and length of a part of each line edge of the first black matrix being in contact with the edge of the shading pattern of the second black matrix is less than length of this line edge of the first black matrix;
    wherein, the at least one of the predefined opening regions of the subpixel provided therein with the second black matrix further includes a third black matrix comprising a shading pattern, edges of the shading pattern of the third black matrix are in contact with one or more line edges of the first black matrix, and length of a part of at least one line edge of the first black matrix being in contact with the edge of shading pattern of the third black matrix is equal to length of the at least one line edge of the first black matrix.

5. The black matrix structure of claim 4, wherein, the first black matrix, the second black matrix and the third black matrix are formed in a single patterning process.

6. The black matrix structure of claim 4, wherein, the shading pattern of the second black matrix is polygonal, circular, or elliptical.

7. The black matrix structure of claim 4, wherein, the shading pattern of the second black matrix has a dimension in at least one direction less than the minimal length that human eyes can see.

8. A manufacturing method of the black matrix structure of claim 4, comprising steps of:
    forming the first black matrix;
    forming the second black matrix; and
    forming the third black matrix.

9. The manufacturing method of claim 8, wherein, the second black matrix includes a plurality of shading patterns, and the plurality of shading patterns of the second black matrix are arranged uniformly in the predefined opening regions.

10. The manufacturing method of claim 8, wherein, the first black matrix and the second black matrix are formed in a single patterning process.

11. The manufacturing method of claim 8, wherein, the first black matrix, the second black matrix and the third black matrix are formed in a single patterning process.

12. An array substrate, comprising the black matrix structure of claim 4.

13. The array substrate of claim 12, comprising a plurality of pixels, each of which includes a red subpixel, a green subpixel and a blue subpixel, each subpixel includes a predefined opening region, wherein, the opening of the green subpixel is identical to the predefined opening region, the predefined opening regions of the red subpixel and the blue subpixel are provided with the second black matrix therein.

14. A color filter substrate, comprising the black matrix structure of claim 4.

15. The color filter substrate of claim 14, comprising a plurality of pixels, each of which includes a red subpixel, a green subpixel and a blue subpixel, each subpixel includes a predefined opening region, wherein, the opening of the green subpixel is identical to the predefined opening region, the predefined opening regions of the red subpixel and the blue subpixel are provided with the second black matrix therein.

16. A display apparatus, comprising the array substrate of claim 12.

17. A display apparatus, comprising the array substrate of claim 13.

18. A display apparatus, comprising the color filter substrate of claim 14.

19. A display apparatus, comprising the color filter substrate of claim 15.

20. The black matrix structure of claim 4, wherein, the second black matrix comprises a plurality of shading patterns, and the plurality of shading patterns of the second black matrix are arranged uniformly in the predefined opening regions.

* * * * *